Oct. 6, 1959　　　D. H. APGAR ET AL　　　2,907,937
DIGITAL SERVO SYSTEM

Filed Dec. 26, 1957　　　　　　　　　　　　　3 Sheets-Sheet 1

INVENTORS
DONALD H. APGAR
ELMER H. BOSMAN
BY
*James K. Mosser*
AGENT

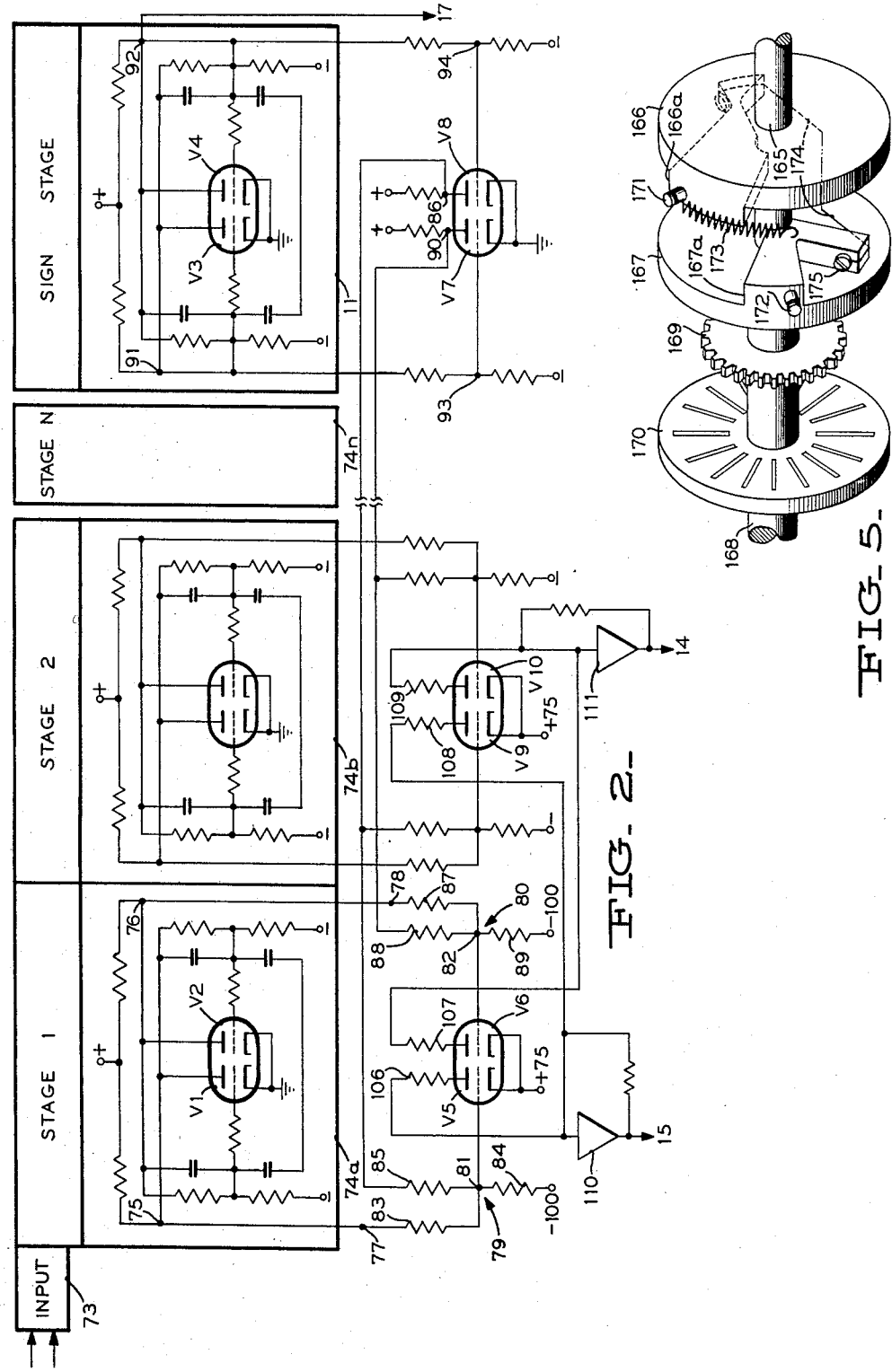

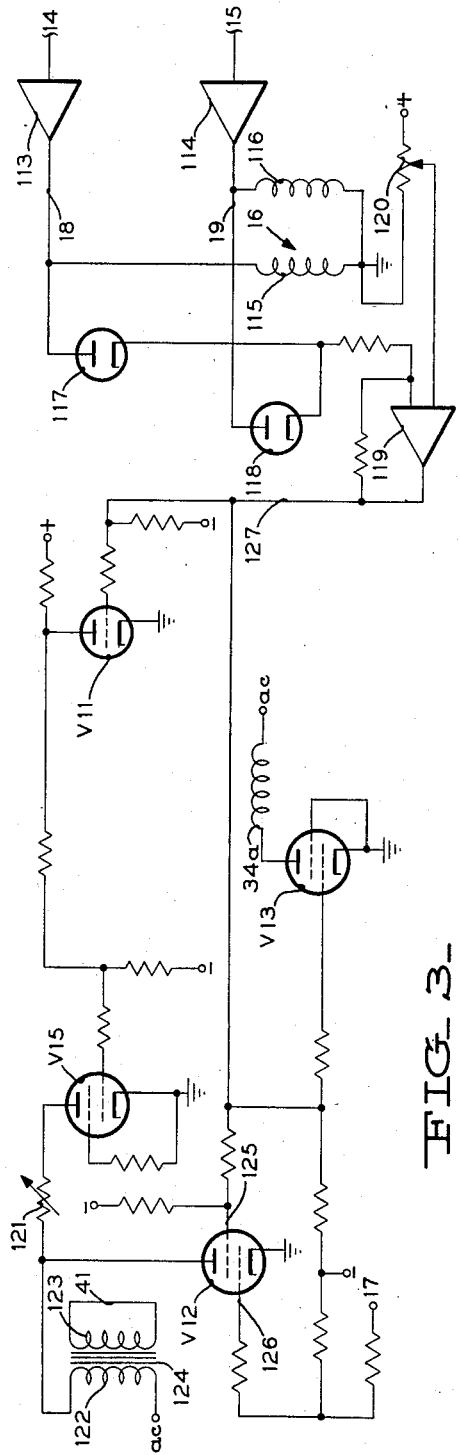
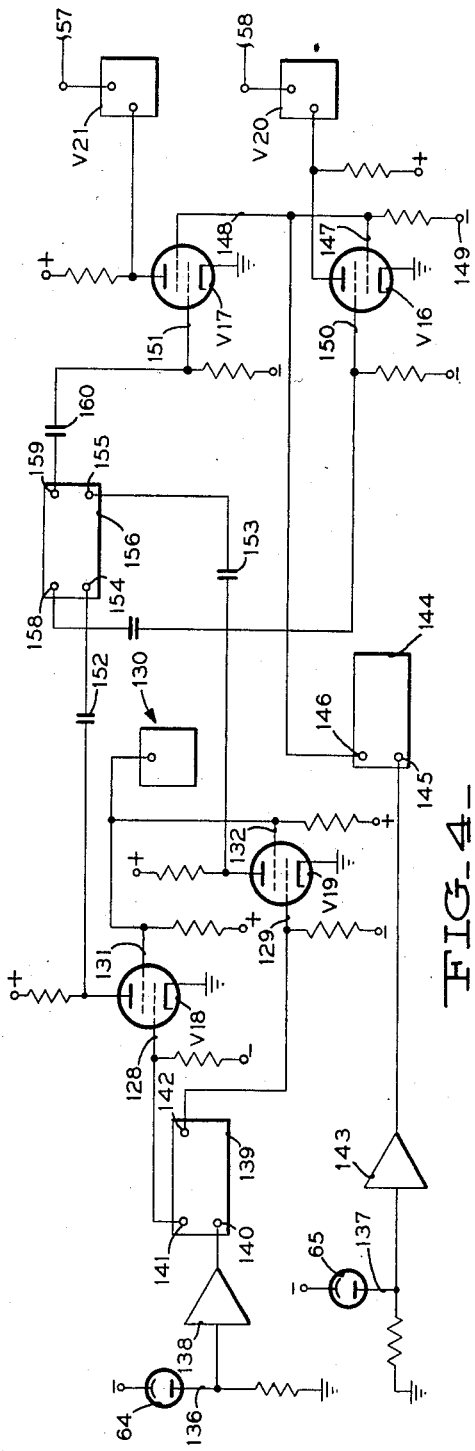

United States Patent Office 2,907,937
Patented Oct. 6, 1959

2,907,937

DIGITAL SERVO SYSTEM

Donald H. Apgar, Binghamton, and Elmer H. Bosman, Johnson City, N.Y., assignors to International Business Machines Corporation, New York, N.Y., a corporation of New York Application December 26, 1957, Serial No. 705,350

12 Claims. (Cl. 318—28)

This invention relates to a servo system and in particular to a servo system utilizing digital data and having an auxiliary positioning apparatus for very precise rebalancing.

In known digital servo systems, a number of digits equal to the desired angular position of a shaft have been entered into a reversible counter, an analog voltage has been developed from the indicated count to control the rotation of the shaft and a feedback pulse generator connected to the shaft has generated pulses in accordance with the movement of the shaft and of opposite phase to the pulses registered in said counter for pulsing said counter to a zero indication for a null.

In a system of the type described, one problem which has been encountered is the inability to remove the last few digits from the counter without causing large oscillations about the zero point of the counter. This is apparent when it is remembered that the controlled shaft is moved by virtue of the analog voltage developed from the digital count contained in the counter, usually by a motor. If the analog voltage is set high enough for the motor to operate when there are say three or four digits in the counter there will be overshooting of the null and subsequent oscillation. If the voltage is set low enough to bring the shaft, by virtue of the motor, into null slow enough to prevent overshooting there is not sufficient voltage to cause rotation of the motor.

In a servo system where a very high degree of accuracy is required, it is necessary that the system neither oscillate through wide excursions about the null nor stop short of the desired position. With this very necessary criteria, a system has been provided wherein the accuracy of positioning has been substantially increased.

It is therefore an object of this invention to provide a new and improved servo system.

It is a further object of this invention to provide a new and improved servo system utilizing digital data for control.

It is another object of this invention to provide a digital servo system having both a coarse and fine positioning apparatus.

A further object of this invention is to provide a closed loop digital servo system using both coarse and fine positioning apparatus.

Another object of this invention is to provide a digital servo system using a fine positioning apparatus responsive to a change in digital input about a zero point for operation.

Yet another object of this invention is to provide a transducer for providing a fine degree of movement to a controlled object.

Still another object of this invention is to provide a thermal element responsive to variations in an electrical output for controlling the position of an object.

Other objects of the invention will be pointed out in the following description and claims and illustrated in the accompanying drawings, which disclose, by way of examples, the principle of the invention and the best mode, which has been contemplated, of applying that principle.

In the drawings:

Figs. 2 through 4 illustrate various electrical circuits of the components shown in Fig. 1; and Fig. 5 is an alternate embodiment of a portion of the invention.

Figure 1:
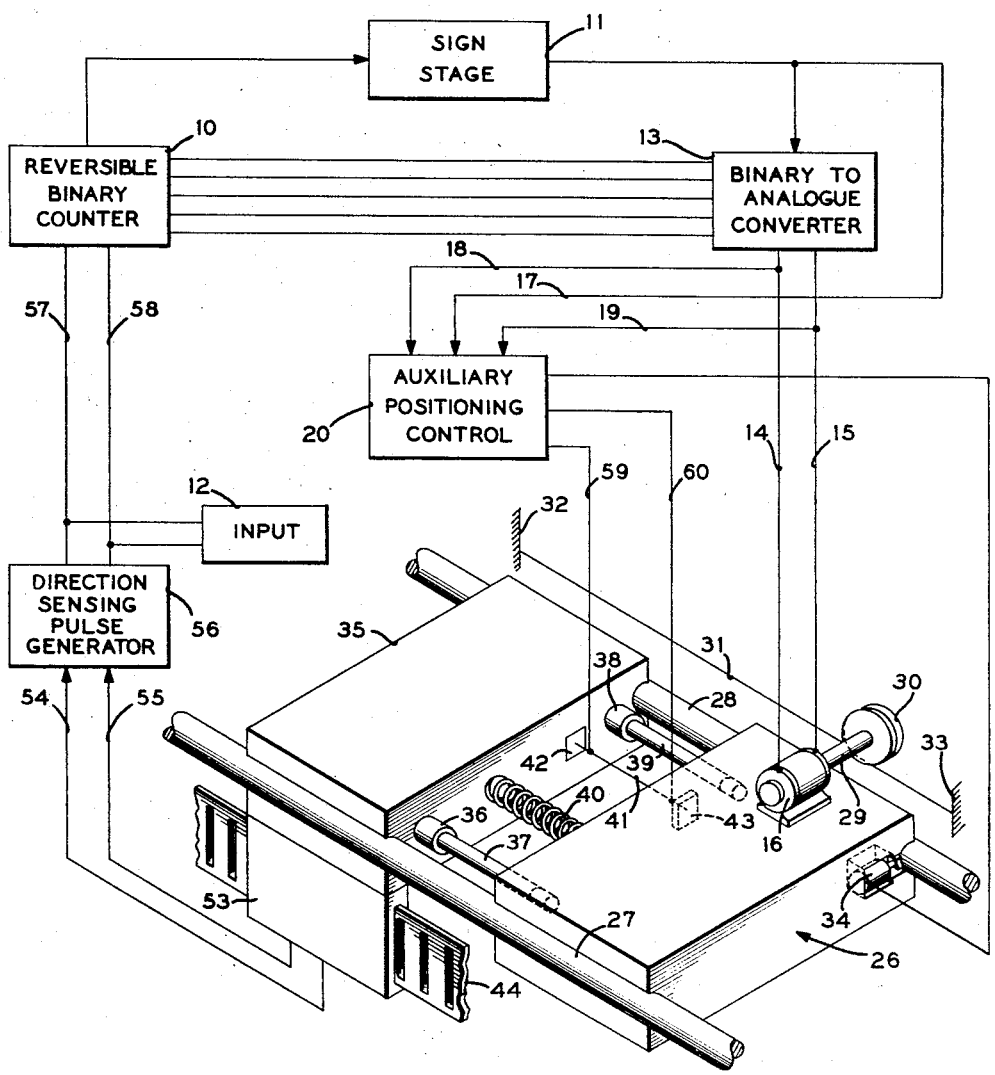
Fig. 1 is a diagrammatic illustration of the invention.

A reversible binary counter 10 as described and claimed in application Serial No. 703,790 filed December 19, 1957, to D. Apgar includes a number of bistable storage elements for registering a series of digits entered therein. A sign stage 11 is provided for determining the class of integers stored therein (forward or reverse) and is the same type of bistable element as contained in the integer stages. Each bistable element is in this instance a trigger circuit containing cross-connected electron tubes wherein the element registers a binary "1" or "0" in accordance with the tubes which are conducting and nonconducting.

It will be assumed for this general description that the system is balanced and a set of input control pulses are now being read from an input 12 which may be a magnetic tape, record card, etc., by appropriate and well-known circuitry into the reversible counter 10. The input control pulses are stored on the record medium as separate and distinct sets of forward and reverse pulses and are sensed by separate reading heads. The pulses operate the counter, initially set at zero with a plus sign, in accordance with the magnitude and sign of the pulses received. It should be noted that whether the pulses are read in serially by number or in parallel as a binary permutation, is completely immaterial insofar as the scope of this invention is concerned.

The number set in the counter is read out in parallel as a binary permutation to a digital to analog converter 13. Here the denominational orders of the binary series are resolved into a common unit base as an analog voltage. Two output lines are provided, forward or reverse, and are selectively chosen by the sign stage 11 in cooperation with the converter circuit 13. Forward and reverse are used here as in other portions of the specification including claims as relative terms indicating solely that they are opposing vector quantities. These output lines 14 and 15 are connected to a motor 16 of the split field type where each output is connected to a different field winding to drive the motor 16 in accordance with the field winding which which has voltage applied thereto. The output lines 14 and 15 are tapped by lines 18 and 19, respectively, and connected to an auxiliary positioning control 20. A further input to control 20 is by means of line 17 from the sign stage 11.

The motor 16 is mounted in any desired manner on a carriage 26 sliding on a pair of ways 27 and 28 suitably supported for rigidity. The carriage 26 may have half bearing surfaces as shown or suitable rollers for riding thereon to provide any desired degree of frictional engagement between carriage and ways. The shaft 29 of motor 16 has a pulley 30 secured thereon for rotation with the shaft 29. The pulley 30 has spirally wound around its body a cable 31 attached to suitable supports 32 and 33. A solenoid brake 34 is secured to carriage 26 and is spring biased away from way 28. When the brake is energized, the carriage 26 is locked against movement.

A carriage 35 is slidably mounted on the ways 27 and 28 in a similar manner to carriage 26. Two pairs of telescoping guide tubes 36, 37 and 38, 39 are provided wherein tubes 36 and 38 are secured to the carriage 35 and tubes 37 and 39 are secured to carriage 26. As shown, the tubes 37 and 39 slide in tubes 36 and 38 and are dimensioned so that they slide freely into one another. These tubes are utilized top revent lateral movement between carriage 26 and 35.

A helical spring 40, fastened to facing ends of the carriages 35 and 26, is placed in compression by a wire 41. The wire 41 terminates in insulating blocks 42 and 43 which are fastened to the carriages 35 and 26, respectively, in any suitable manner, e.g., rivets, so that the wire is structurally attached between carriages but is electrically insulated therefrom. The wire 41 can, for example, be Nichrome #26.

The wire 41 is connected at each end to a line 59 and 60 from the auxiliary positioning control 20. The control 20 supplies a predetermined voltage between lines 59 and 60 when the carriages 35 and 26 are moving so that the relative positions of the carriages remains fixed. When the carriage 26 is no longer being moved, the voltage from control 20 is varied either higher or lower to position the carriage 35 to the exact desired position. The wire 41 being connected across a voltage source conducts a value of current in accordance with the applied voltage and the resistance of the wire. As the wire conducts, it will be heated proportional to the amount of current and consequently will have a length determined by the current flow. The helical spring 40 is always in compression by reason of the tensioned wire 41 so that as the wire expands, the spring 40 moves the carriage 35 away from carriage 26. The wire 41, when it contracts, will compress the spring 40 still further and moves the carriage 35 toward the carriage 26. Other transducers can, of course, be used to perform a similar function in response to an applied voltage.

Mounted directly beneath the carriages 35 and 26 is an optical grating 44 which cooperates with a sensing apparatus 53 mounted on carriage 35 and straddling the grating 44. The sensing apparatus 53 generates pulses on either lines 54 or 55 for continuous movement of carriage 35 in one direction or the other. Connected to the lines 54 and 55 is a direction sensing pulse generator 56 which determines the direction of movement of carriage 35 and transmits pulses to the counter 10 on either line 57 or 58 depending on the direction of movement.

With the counter initially set to zero, a series of pulses from input 12 on either line 57 or 58 will pulse the counter until a binary number is stored representative of the number of pulses. The sign stage 11 will be set at the same instant to represent a forward or reverse count in the counter 10. The binary number registered in the counter 10 will be translated to an analog value by the converter 13 in cooperation with the sign stage 11 and will appear on the forward or reverse line 14 or 15 in accordance with the sign contained in stage 11.

The motor 16 will be energized by either the forward or reverse line 14 or 15 and will rotate the shaft 29 in accordance with the particular line so energized. As the shaft 29 rotates and thus rotates the pulley 30, the wire 31 will be wound on the pulley 30 from one side and unwound in the other, depending on the direction of rotation of the pulley. Since the wire 31 is fixed at 32 and 33, the translational movement from pulley to wire is reflected as a reactive force to the motor 16, which, being mounted on a slidable carriage 26, moves in accordance with the rotation of pulley 30. The solenoid brake 34 was released by a signal from the auxiliary positioning control 20 at the same instant that the voltage from line 14 or 15 was applied to the motor 16.

As the carriage 26 moves, the carriage 35 is moved also an equal amount by reason of the spring 40 and wire 41. The sensing station 53, which is mounted on the carriage 35, generates pulses in accordance with the movement over lines 54 and 55, wherein the direction sensing pulse generator transmits pulses over line 57 or 58 to pulse the counter 10 in an opposite sense to the pulses which were entered therein from input 12.

When the number of pulses originally entered into the counter has been reduced until there are only two or three remaining therein, the voltage on line 14 or 15 will drop to a value insufficient to drive the motor 16. When the voltage on line 14 or 15 reaches a predetermined value which approximates or is greater than a voltage insufficient to drive motor 16, the positioning control 20 will allow the solenoid brake 34 to operate and fix the carriage 26 at a predetermined position.

It will be remembered that the wire 41 has a predetermined voltage applied across its terminals 42 and 43 while the carriages are moving which as now specified is when the voltage on line 14 or line 15 is above some predetermined value. When this voltage falls below this value, the voltage applied across wire 41 will vary in accordance with the direction in which the carriage 35 is to move, i.e., a decrease in voltage to move carriage 35 closer to carriage 26 or an increase in voltage for the opposite effect. As the carriage 35 moves in response to the raising or lowering of voltage on lines 59 and 60, the sensing apparatus 53 transmits pulses to generator 56 which in turn pulses counter 10. When the counter 10 is pulsed through zero and consequently a change in sign, the sign stage 11 will switch and furnish an indication of this fact by line 17 to control 20. The control 20 in response to this change in sign will vary the impressed voltage across 59 and 60 in the opposite sense to that which originally caused the deformation so that if the wire 41 was first expanded it will now be contracted and the carriage 35 will move in the opposite direction. As the carriage 35 moves a first pulse will be generated by generator 56, will reverse the count in counter 10 and the sign stage 11 will again switch to the opposite sign and indicate this fact over line 17 to control 20 which will again vary the voltage in the same sense that it was first varied.

The system in its broad aspect is therefore one in which the transmitter delivers a command voltage to move the receiver with a feedback loop from receiver to transmitter for monitoring the position of the receiver with respect to the voltage delivered by the transmitter with an auxiliary positioning control operative at voltages less than some predetermined value for providing a fine degree of control over the receiver. This auxiliary positioning control 20 being operative at voltages less than some predetermined value is also phase sensitive to the sign contained in the sign stage 11 and delivers a sequential high and low voltage about some mean voltage in response to sequential changes in sign of said sign stage 11. The net effect therefor is to oscillate the carriage 35 about the zero point of the desired coordinate position as set in the counter 10. The amplitude of oscillation of carriage 35 is determined by the sensitivity of the sensing apparatus 53 in response to these oscillations.

The sensing apparatus 53 is shown in detail in Fig. 1 in cooperation with the grading plate 44 fixed beneath the way 27. The optical glass plate 44 has formed thereon alternate opaque and transparent sections of equal width to form an optical grating capable of transmitting light through transparent sections and obstructing light by the opaque sections. The manner in which such gratings are constructed does not form part of the present invention but it appears obvious that ruling machines or photographic processes would be quite suitable. At the present time, gratings having 10,000 lines per inch are commercially available and subsequent description of this invention will utilize this figure. The lines per inch above refer to transparent lines so that there would be in fact 20,000 alternate opaque and transparent sections per inch.

Carried on the carriage 35 is an optical grating 61 containing two transparent sections 61a and 61b with the remainder of the plate being opaque. The sections 61a and 61b are of equal width and dimensioned so that each section covers a plurality of openings in the grating 44.

This allows the light through a large number of openings in grating 44 to be sensed with a consequent averaging to obtain greater accuracy. The sections 61a and 61b are pitched so that they are 90° displaced with respect to the pitch of grating 44. The 90° above is referable to the 360° span of one transparent plus one opaque section.

A pair of lamps 62 and 63 are optically aligned with the transparent sections 61a and 61b, respectively, so that the rays of light emanating from lamps 62 and 63 are directed through these sections. The lamps 62 and 63 are positioned on the far side of grating 44 and in close proximity thereto while being attached to carriage 35. A pair of photodiodes 64 and 65 are aligned with the transparent sections 61a and 61b and the light sources 62 and 63 and are positioned on the near side of grating 61 while attached to carriage 35. The elements 61 through 65 comprise the sensing apparatus 53.

As the carriage 35 moves either right or left, the photodiodes 64 and 65 are each exposed successively to varying amplitude light flux from sources 62 and 63 as alternate transparent and opaque sections progressively admit and cut off this flux. Since the sections 61a and 61b are not pitched the same as the sections on grating 44, the light flux through 61a and 61b will be out of phase with respect to each other. The photodiodes being responsive to the magnitude of light impinging thereon will transmit varying voltages in accordance with the variations in light intensity.

The means by which the digital count contained in the counter is converted to an analog voltage is shown in Fig. 2. The binary counter 10, as mentioned previously, is shown and described in the above-mentioned Apgar application. For the present description only the storage element of stages 1 and 2 have been reproduced along with the sign stage. As shown, the storage element of stage 1, 74a, consists of two triodes V1 and V2 connected plate to grid for mutually exclusive operation. The sign stage 11 consists of triodes V3 and V4 connected in an identical manner. The input 73 is a double inverter such as shown in the above-mentioned copending application and is utilized for generating an extra pulse for utilization in the counting circuit.

For the instant application stage 1, 74a, is said to be "On" or representing a binary "1" when the left tube V1 is conducting and the right tube V2 is nonconducting for a forward count. Stages 74b to 74n use an identical terminology. When the count in the counter 10 is forward, the tubes in sign stage 11, V3 and V4 will be conducting and nonconducting, respectively. For a reverse count in the counter 10, the terminology will be reversed, i.e., stage 74a will be at binary "1" when the left tube V1 is nonconducting and the right tube V2 is conducting while tube V3 and V4 will be conducting and nonconducting, respectively. At the zero or null of the counter 10, each stage 74a through 74n is standing at binary "0," V1 conducting, and V2 nonconducting, with the sign stage indicating a forward count. For a reverse pulse then entered into the counter, all stages 74a through 74n will switch conducting states as will the sign stage 11. Using the above terminology for reverse counting, it is seen that this first reverse pulse gives rise to a reverse zero condition while each subsequent reverse pulse adds one to the reverse count in the counter. The precise operation of the counter 10 in these respects is given in the afore-mentioned application and it is believed sufficient in describing the present invention that a statement of operation be given.

Referring specifically to Fig. 2, it is seen that tubes V1 and V2 of 74a have terminals at their plates at 75 and 76, respectively, which are connected to terminals 77 and 78 of a resistance network 79 and 80. The center tap of 81 and 82 each resistance network 79 and 80 is connected respectively to the grid of tubes V5 and V6. In resistance network 79, the resistance 83 connects the terminal 77 to terminal 81, the resistance 84 connects minus voltage to terminal 81, while the resistance 85 is connected between terminal 81 and the plate terminal 86 of tube V8. In resistance network 80, the connections are similar except that resistor 87 connects terminal 78 to terminal 82 while resistance 88 connects terminal 82 to the plate terminal 90 of tube V7.

The plate voltage at terminals 75 or 76 of tubes V1 and V2 varies from 40 volts to 140 volts for conducting and nonconducting conditions, respectively. Tubes V3 and V4 have similar voltage conditions at their plate terminals 91 and 92. As shown, the terminals 91 and 92 are connected through resistors to the terminals 93 and 94 of tubes V7 and V8. The grids of tubes V7 and V8 are biased by a negative voltage sufficient to cut the tube off when the voltage at the associated terminal 91 or 92 is standing at 40 volts but is insufficient when the same is standing at 140 volts so that the associated tube conducts. The tubes V7 and V8 have two conditions of plate voltage at terminals 90 and 86 which are 140 volts or 40 volts depending on whether the particular tube is nonconducting or not.

The resistance networks 79 and 80 and every other network associated with each converter circuit is proportioned as shown so that a potential of 40 volts applied across resistors such as 85 or 88 of tubes V5 and V6 is sufficient to keep the tubes in a state of nonconduction even though the applied voltage across resistors such as 83 or 87 is 140 volts. The application of 140 volts, however, to resistors such as 85 or 88 raises the potential at terminal points 81 or 82, sufficiently high so that the application of 140 volts across resistors such as 85 or 88 will cause conduction in the associated tube while 40 volts will not cause conduction.

It will be remembered that for forward counting a stage is "On" or at a binary "1" when the left tube, such as V1 was conducting and the right tube, such as V2, was nonconducting while the sign stage 11 is set at V3 conducting and V4 nonconducting. With V3 conducting, V7 will be nonconducting and with V4 nonconducting, V8 will be conducting. The plate voltage at terminal 86 of tube V8 will therefore be low and all left hand tubes V5, V9, etc., will be prevented from conducting while all right hand tubes, such as V6, V10, etc., will conduct if 140 volts is applied to terminals such as 78. With tube V2 nonconducting, the tube V6 will therefore conduct. If stage 2, 74b, is set at binary "1," right tube nonconducting, tube V10 would also conduct. Other tubes in the inverter act in the same manner. If any stage is at binary "0," the converter tubes are not raised to conduction since V8 has furnished only 40 volts to the resistance networks of the left tubes and the counter stage has furnished only 40 volts to the right tubes.

For reverse counting, V8 is nonconducting and all left tubes in the converter stages are raised sufficient to conduct if the left side of a counter stage is nonconducting which is a binary "1" for reverse counting.

The resistors 106, 107; 108, 109; etc., are proportioned to give a weighted value to the current flow in accordance with the counter stage with which they are associated. If, for example, there were five stages in all, the resistances 106, 107 would be sixteen times larger than the resistors associated with stage 5 while resistors 108, 109 would be eight times larger, etc., in decreasing powers of two. This is apparent when it is recognized that stage 1, 74a, represents 1 in the decimal system while 74b represents decimal 2 up to stage 5 which represents decimal 16.

The outputs from the left tube of each converter stage are paralleled together to a summing amplifier 110 while the right tubes are paralleled to a summing amplifier 111. The resulting voltage is applied to output line 14 or 15 which is the forward or reverse line, respectively.

An amplifier 113 and 114 is connected in lines 14 and 15, respectively, Fig. 3, to drive the servomotor 16. The motor 16 is of the split field type and one winding 115 is connected to line 14 to drive the motor 16 in a forward direction when energized while the other winding 116 is utilized to drive the motor in the reverse direction. A pair of rectifiers 117 and 118 couple the output of amplifier 113 or 114 by means of lines 18 and 19 to a D.C. summing amplifier 119. The amplifier 119 is adjusted by means of a bias resistor 120 to cut off when the output voltage of either servo amplifier 113 or 114 falls below a value insufficient to drive the motor (this is predetermined).

When the output voltage is high enough to drive the motor 16, the amplifier 119 will be conducting and the plate voltage, line 127 will be insufficient to cause conduction in tubes V11, V12 and V13, normally biased to nonconduction. With tube V11 nonconducting, the plate voltage will be high and cause conduction in tube V15. The plate of tube V15 is connected through a variable resistor 121 and the primary coil 122 of a transformer 124 to a source of potential. By adjusting resistor 121, the current flow through coil 122 can be predetermined. Connected across the secondary side 123 of transformer 124 is the thermal element 41 which is heated in accordance with the current flow in the secondary as determined by the resistor 121 in the primary. While the motor 16 is running and the voltage output of either servo amplifier 113 or 114 is high, the thermal element 41 will have a predetermined value of current being conducted therethrough which will determine its length.

When the output voltage of servo amplifiers 113 or 114 is insufficient to drive the motor 16 and the amplifier 119 goes nonconducting which drives the plate line 127 positive, tubes V11 and V13 will conduct and tube V12 will be conditioned for conduction by the application of positive voltage to its grid 125. V15 will now be nonconducting since the input from the plate of tube V11 will be down (V11 conducting) so that the primary 122 of transformer 124 will not have a completed circuit and consequently no current will flow through thermal element 41. When tube V13 conducts a solenoid coil 34a connected in the plate circuit will be energized to actuate the brake 34 and lock the table 26 from movement.

As mentioned previously, tube V12 was conditioned for operation by the application of positive voltage to grid 125. Before tube V12 can conduct, however, it is necessary that positive voltage be applied to grid 126 also. Grid 126 is connected by means of line 17 to the terminal 92 of tube V7 in sign stage 11 which is high when the counter is set at a forward count which would cause grid 126 to be high and the tube V12 to conduct. When tube V12 conducts, the primary 122 of transformer 124 will be energized by a larger voltage than that obtained from tube V15 and the thermal element 41 will be heated further to expand and allow spring 40, Fig. 1, to move carriage 35 away from carriage 26. When the sign control goes to a reverse indication, the voltage on line 17 will be down and the tube V12 will be cut off and the thermal element 41 will cool and carriage 35 will move closer to carriage 26. Since the sign stage 11 changes states about its zero points for each sequential forward and reverse pulse delivered to the counter, the carriage 35 will be positioned to within one pulse count of the sensing mechanisms 53, Fig. 1.

Figure 1A:
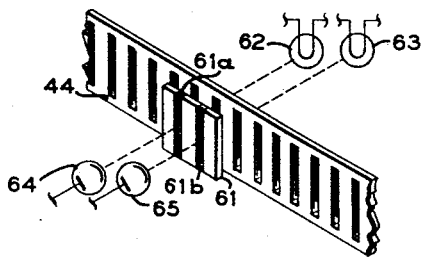
Fig. 1a is a detail enlarged isometric of a pulse generator shown in Fig. 1.

The actual positioning can be adjusted to a very much smaller increment than the actual spacing between sections on the grating 44, Fig. 1a, by adjusting the triggers 139 and 144, Fig. 4, to operate on small voltage changes caused by the changes in conduction of photodiodes 64 and 65. As will be explained presently, the change in light level by the gratings 44 and 61 is operative to generate pulses from generator 56.

The direction sensing circuit, Fig. 1, is shown in detail in Fig. 4 along with the photocells 64 and 65 which form part of the sensing apparatus 53. The photocells 64 and 65 are each connected across a negative potential and have a terminal 136 and 137, respectively, utilized for an output. As each photocell is exposed to greater magnitudes of light, the terminals 136 and 137 will drop from near ground potential to approximately that potential of the applied negative source.

The photocell 64 is connected by means of amplifier 138 to a trigger circuit 139. This is a self-restoring trigger in that in the absence of potential greater than a certain value on terminal 140, representing the grid of the left tube, allows terminal 141, representing the plate of the left tube, to be set at a high voltage, left tube cut off. The plate of the right tube represented by terminal 142 represents the opposite condition of the left tube so that it would be conducting under conditions of less than a certain voltage applied to terminal 140. When photodiode 64 is dark, the terminal 136 will be at some small potential below ground, the amplifier 138 will be conducting and the voltage applied to terminal 140 will be low and the afore-mentioned conditions will prevail. As the photodiode 64 is exposed to more light, the terminal 136 would become more negative and the amplifier 138 will apply a more positive voltage to terminal 140 until a time when the applied voltage is sufficient to switch the trigger 139 to its alternate conduction states.

Photodiode 65 is connected in the same manner through an amplifier 143 to a trigger circuit 144 so that when photodiode 65 is dark, the terminal 146 is high. Terminal 146 is connected to the grids 147 and 148 of coincidence tubes V16 and V17, respectively. Each grid 147 and 148 is biased negatively by a voltage source 149 so that in the absence of a high voltage from terminal 146 there can be no conduction in tube V16 or V17. The converse is also true that when terminal 146 is high, the tubes V16 and V17 are conditioned for conduction and either will conduct when a positive voltage pulse is applied to grid 150 or 151, respectively. The output from the plates of tubes V16 and V17 is applied through inverters V20 and V21 to lines 57 and 58 which are the forward and reverse lines, respectively.

The output terminals 141 and 142 of trigger 139 are connected to coincidence tubes V18 and V19, normally biased to nonconduction. With terminal 141 high the negative bias on grid 128 will be overcome and the tube V18 will be conditioned for conduction. The tube V19 is likewise conditioned for conduction by application of a high potential at terminal 42 and correspondingly on grid 129. The grids 131 and 132 of V18 and V19 are normally biased to a plus potential. In the absence of a pulse from synchronizing pulse generator 130, tube V18 and V19 will conduct upon application of a positive pulse to grid 128 or 129, respectively. The pulse generator 130 consists of a pair of inverters each responsive to a pulse from the input 12 of Fig. 1 for generating a negative pulse on grids 131 and 132 for preventing conduction in tubes V18 and V19, when pulses are being read into said counter. This is to prevent interference between pulses from the input 12 and pulses from pulse generator 56. Since the input pulse rate is extremely high and the pulse rate of generator 56 is low there will be no pulse loss in coincidence tubes V18 and V19. Connected to the output of coincidence tubes V18 and V19 are condensers 152 and 153 which isolate the steady state output of the tubes V18 and V19 from the terminals 154 and 155 of a multistable flip flop 156. This circuit, similar to 74a of the counting circuit, changes state only upon application of a negative pulse to the grid of the tube which is conducting and remains in that condition until a negative pulse is applied to the opposite tube.

Flip flop 156 in this circuit is a memory for the last change in state of the photodiode 64 so that if photodiode is now dark, terminal 141 went from a high to a low voltage while terminal 142 went from low to high. At that time coincidence tube V18 was biased off and the plate voltage went up while coincidence tube V19 went into conduction and the plate voltage went down. Condenser 153 would therefore connect a negative voltage pulse to the input of flip flop 156 to reverse the previous conduction states and terminal 159 would go up and terminal 158 would go down. With terminal 159 going to a high voltage level, the change would appear across condenser 160 to grid 151 of tube V17. If photodiode 65 were dark at this time, grid 148 would also be high and tube V17 would conduct to generate a negative-going pulse which would be applied to inverter V21 and subsequently to the forward line 57.

Terminal 158 of flip flop 156 is connected to grid 150 of tube V16 through a condenser 161 so that for a change in photodiode 64 from dark to light a positive-going pulse is applied to grid 150 to condition tube V16 for conduction.

The conditions met by the logic circuit of Fig. 4 are as follows:

(1) When photodiode 65 is exposed to sufficient light and photodiode 64 goes from light to dark, a forward pulse is generated.

(2) When photodiode 65 is exposed to insufficient light and photodiode 64 goes from dark to light, a reverse pulse is generated.

The apparatus of Fig. 5, shows an alternate construction for the positioning mechanism of servo motor 16 and is intended for use as a rotary motion producing device.

A shaft 165 represents the motor shaft of a motor such as 16, Fig. 1. A disc 166 is secured to said shaft 165 for rotation therewtih by any suitable means. A second disc 167 is freely rotatable on the shaft 165 and has secured to the opposite face thereof a shaft 168 which rotates with disc 167. Secured on the shaft 168 is a gear 169 and an optical grating 170. The gear 169 is utilized for transmitting motion to any object to be controlled while the grating 170 is similar to grating 44, Fig. 1a, except that the sections are radial instead of transverse.

The discs are formed of nonconducting material and have shaped inner faces 166a and 167a biased toward each other by a spring 173 attached at each by a pin 172 and 171. A wire 174 is attached to a terminal connector 175 on disc face 167a and a terminal connector (not shown) on disc face 166a. The wire is tensioned between the terminal connectors sufficient to elongate the spring and move face 167a away from 166a.

Potential from a positioning control such as 20, Fig. 1, is applied to each terminal connector by suitable means such as slip rings, not shown. The apparatus functions in the same manner as that described in connection with Fig. 1, except that in this case the output is via the rotary motion transmitting gear 168.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A digital servo system for positioning an element to a predetermined position as determined by a source of digital data comprising a reversible counter for storing said digital data, a sign stage for storing a vector sign indicative of the quality of said digital data, motor means for said element operable in response to the data stored in said register greater than some predetermined value for moving said element in a direction determined by said sign, and an auxiliary motor means responsive to data less than said predetermined value for moving said element in accordance with said sign.

2. The apparatus of claim 1 further including a digital data generating apparatus responsive to movement of said element for transmitting digital data to said reversible counter of the opposite sign to that which produced the movement of the element.

3. The apparatus of claim 2 wherein said auxiliary motor means is responsive to the operation of said sign stage to an opposite sign in response to the digital data from said generating means for moving said element in the opposite direction to the direction originally produced by said digital data.

4. A digital servo system for positioning an element to a predetermined position comprising a register for storing digital data indicative of the position to which said element is to move, a sign stage associated with said register for storing a vector sign indicative of the quality of said data, a first motor means responsive to data stored in said register and said vector sign for moving said element to a position approximately the position representing said digital data and a second motor means responsive to the vector sign for moving said element to said predetermined position.

5. The apparatus of claim 4 further comprising a pulse generator responsive to the movement of said element for transmitting digital data to said register of opposite sign to the digital data producing movement of said element.

6. The apparatus of claim 5 wherein said first motor means includes a split field motor including a shaft, each field being selected under control of said vector sign for rotation of said shaft in a direction determined by said field.

7. The apparatus of claim 6 wherein said second motor means includes a tensioned wire responsive to variations in an applied voltage for changing its length.

8. The apparatus of claim 6 wherein the shaft of said first motor means has connected thereto a first disc, a second disc freely movable on said shaft, said tensioned wire being connected between said first and second discs and limiting relative movement between said discs in one direction, and a spring connected between said discs for limiting movement in another direction, said element being secured to said second disc for rotation therewith.

9. The apparatus of claim 7 further including a carriage mounted for movement on which said first motor means is attached, said element comprising a second carriage mounted for movement, said tensioned wire being secured between carriages to limit relative movement in one direction, and a spring secured between carriages and supplying tension to said wire to limit relative movement of said carriages in an opposite direction.

10. A digital servo system for positioning an element to a predetermined position as determined by a source of digital data comprising a reversible counter for storing said digital data, a sign stage for storing a vector sign indicative of the quality of said digital data, motor means for said element operable in response to the data stored in said register greater than some predetermined value for moving said element in a direction determined by said sign, and an auxiliary motor means responsive to data less than said predetermined value for moving said element in accordance with said sign, said auxiliary motor means including a spring tensioned wire having a potential applied thereacross, a source of potential for said wire including a first and second electron tube operable to supply said potential biased to conduction and nonconduction, respectively, when said data is above said predetermined value and biased to nonconduction and conditioned for conduction, respectively, when said data is below said predetermined value, said second tube being biased to conduction by a predetermined vector sign.

11. The apparatus of claim 10 further comprising a pulse generator responsive to the movement of said element for transmitting digital data to said register of opposite sign to the digital data producing movement of said element whereby the second tube is sequentially biased to conduction and nonconduction in accordance with the change in sign of said sign stage.

12. A digital servo system for positioning an element to a predetermined position as determined by a source of digital data comprising a reversible counter for storing said digit data, motor means for said element operable in response to the data stored in said counter greater than some predetermined value for moving said element toward said predetermined postion, a pulse generator responsive to the movement of said element for transmitting digital data to said counter to pulse said counter toward zero and auxiliary motor means responsive to said predetermined value of digital data in said counter for moving said element to said predetermined position.

References Cited in the file of this patent

UNITED STATES PATENTS 2,840,771   Kamm _____ June 24, 1958